United States Patent
Gluck et al.

(10) Patent No.: US 12,428,308 B2
(45) Date of Patent: Sep. 30, 2025

(54) PRODUCTION OF STRONTIUM SULFATE AND STRONTIUM CARBONATE FROM BRINES

(71) Applicants: Steven Gluck, Lake Jackson, TX (US); Jason D Lalli, Washington, PA (US)

(72) Inventors: Steven Gluck, Lake Jackson, TX (US); Jason D Lalli, Washington, PA (US)

(*) Notice: Subject to any disclaimer, the term of this patent is extended or adjusted under 35 U.S.C. 154(b) by 829 days.

(21) Appl. No.: 17/550,295

(22) Filed: Dec. 14, 2021

(65) Prior Publication Data

US 2022/0204356 A1 Jun. 30, 2022

Related U.S. Application Data

(60) Provisional application No. 63/178,767, filed on Apr. 23, 2021, provisional application No. 63/129,147, filed on Dec. 22, 2020.

(51) Int. Cl.
*B01D 37/03* (2006.01)
*C01F 11/18* (2006.01)
(Continued)

(52) U.S. Cl.
CPC ............ *C01F 11/187* (2013.01); *B01D 37/03* (2013.01); *C02F 1/001* (2013.01); *C02F 1/5236* (2013.01);
(Continued)

(58) Field of Classification Search
CPC ........ C01F 11/187; B01D 37/03; C02F 1/001; C02F 1/5236; C02F 2101/20; C02F 2103/10
See application file for complete search history.

(56) References Cited

U.S. PATENT DOCUMENTS 3,029,133 A * 4/1962 Goodenough ........ C01F 11/462
423/157.4
4,110,402 A 8/1978 Bauman et al.
(Continued)

FOREIGN PATENT DOCUMENTS

CN 103351015 A 10/2013
CN 102765740 B 3/2014
(Continued)

OTHER PUBLICATIONS

Zhang et al., "Superhydrophobic Substrates from Off-the-Shelf Laboratory Filter Paper: Simplified Preparation, Patterning, and Assay Application", ACS Appl. Mater. Interfaces 2017, 9, 39728-39735 (Year: 2017).*

(Continued)

*Primary Examiner* — Michael Forrest
*Assistant Examiner* — Gail Boardman
(74) *Attorney, Agent, or Firm* — Metz Lewis Brodman Must O'Keefe

(57) ABSTRACT

The present invention relates to a process to produce high purity strontium sulfate and strontium carbonate from subterranean brines. The present disclosure also relates to chemical precipitations of subterranean brines to isolate strontium from divalent cations, such as calcium and barium. Such precipitations include the use of sulfate and subsequent solids separations and washing of the precipitate. In a latter step in the strontium carbonate process, a metathesis reaction with a carbonate is performed upon the strontium sulfate to produce strontium carbonate while allowing optional recycling of the sulfate. An additional rinse with acid or water of the strontium sulfate may be performed prior to metathesis to increase the purity of the resulting strontium carbonate.

19 Claims, 7 Drawing Sheets

(51) Int. Cl.
*C02F 1/00* (2023.01)
*C02F 1/52* (2023.01)
C02F 101/20 (2006.01)
C02F 103/10 (2006.01)

(52) U.S. Cl.
CPC ...... *C02F 2101/20* (2013.01); *C02F 2103/10* (2013.01)

(56) References Cited

U.S. PATENT DOCUMENTS

| | | | |
|---|---|---|---|
| 4,666,688 A | 5/1987 | de Buda | |
| 4,842,833 A | 6/1989 | Jager | |
| 4,980,135 A | 12/1990 | Porta | |
| 8,273,320 B2* | 9/2012 | DiTommaso | C02F 1/048 23/302 R |
| 8,723,320 B2 | 5/2014 | DiTommaso | |
| 8,877,690 B2 | 11/2014 | Keister | |
| 2011/0104038 A1 | 5/2011 | DiTommaso et al. | |
| 2013/0048562 A1* | 2/2013 | Keister | C02F 9/00 423/166 |
| 2014/0158632 A1 | 6/2014 | Govind et al. | |
| 2017/0217802 A1 | 8/2017 | Kostedt, IV et al. | |

FOREIGN PATENT DOCUMENTS

WO WO20010177021 A1 10/2001
WO WO2010151729 A1 12/2010

OTHER PUBLICATIONS

Gusa et.al., "Sulfate precipitation in produced water from Marcellus Shale for the control of naturally occurring radioactive material", published online Apr. 20, 2020, Water Research, 177, 115785 (Year: 2020).*

Benko, Katie L., et al., Produced Water in the Western United States: Geographical Distribution, Occurrence, and Composition, Environmental Engineering Science, 2008, pp. 239-246, vol. 25, No. 2, Mary Ann Liebert, Inc., New Rochelle, NY.

Zoraga, Mert, et al., Kinetics of Conversion of Celestite to Strontium Carbonate in Solutions Containing Carbonate, Bicarbonate and ammonium ions, and Dissolved Ammonia, Journal of the Serbian Chemical Society, 2014, pp. 345-359, vol. 79, No. 3, Serbian Chemical Society, Belgrade, Serbia.

International Searching Authority; International Search Report and Written Opinion of the International Searching Authority; International Application No. PCT/US21/64777; Patent Cooperation Treaty; pp. 1-6; publisher United States International Searching Authority; Published Alexandria, Virginia, US; copyright and mailing date Mar. 8, 2022; copy enclosed (6 pages).

* cited by examiner

PRODUCTION OF STRONTIUM SULFATE AND STRONTIUM CARBONATE FROM BRINES

CROSS-REFERENCE TO RELATED APPLICATIONS

The present application claims the benefit of U.S. Provisional Application No. 63/129,147, filed Dec. 22, 2020, and U.S. Provisional Application No. 63/178,767 filed Apr. 23, 2021, the contents of which are incorporated herein by reference in their entirety.

FIELD OF THE INVENTION

The present invention relates to methods of recovering high quality strontium sulfate ($SrSO_4$) and/or strontium carbonate ($SrCO_3$) from salt solutions having low concentrations (<1%) of strontium and significant concentrations of other contaminants, including other divalent cations such as barium ($Ba^{2+}$) and calcium ($Ca^{2+}$).

BACKGROUND OF THE INVENTION

Strontium is a relatively rare alkaline-earth metal commonly found as insoluble sulfate, carbonate, silicate and phosphate deposits in the earth's crust. Strontium carbonate, itself or as a precursor to materials, has a variety of uses in electronics, glass, pharmaceutical, magnetics, paint, electroluminescent, and pyrotechnical industries. High purity strontium carbonate is often required for these applications but is difficult to achieve in economical quantities. Other than a relatively small amount found as strontium carbonate, it is typically recovered from celestite ores as strontium sulfate, which has low commercial value relative to its availability. Through multiple step chemical and physical processing, the strontium sulfate is converted to high purity strontium carbonate.

The most common production processes for strontium carbonate are the "black ash" and the "direct conversion" processes. In the black ash process, celestite is roasted with finely divided carbon and the mixture is calcined at elevated temperatures of about 1000° C. to produce strontium sulfide (SrS), carbon dioxide ($CO_2$) and carbon monoxide (CO):

$$SrSO_4 + 2C \rightarrow SrS + nCO + (2-n)CO_2$$

where n is a process operation dependent number between 0 and 1. The water soluble SrS is leached from the black ash calcination product with hot water and the solids removed from the water by filtration or settling. The dissolved SrS is converted to strontium carbonate by either sodium carbonate ($Na_2CO_3$), $CO_2$ or a mixture of both while producing hydrogen sulfide ($H_2S$) or sodium sulfide ($Na_2S$):

$$SrS + H_2O + CO_2 \rightarrow SrCO_3 + H_2S \text{ or}$$

$$SrS + Na_2CO_3 \rightarrow SrCO_3 + Na_2S$$

The strontium carbonate is a solid precipitate which is separated, washed and dried. Though commercially utilized, the black ash process has disadvantages including requiring significantly elevated process temperatures and the disposal of undesirable reactant by-products such as $Na_2S$ or $H_2S$.

In the direct conversion process, high quality celestite and $Na_2CO_3$ are ground, blended and treated with steam to form strontium carbonate directly in a metathesis reaction with substantial amounts of other impurities and dissolved sodium sulfate ($Na_2SO_4$) or other sulfate reagent:

$$SrSO_4 + Na_2CO_3 + H_2O \rightarrow SrCO_3 + Na_2SO_4 + H_2O$$

The solid reaction products are mixed with hydrochloric acid (HCl) which dissolves the strontium carbonate to form dissolved strontium chloride ($SrCl_2$) and the solids are separated. $CO_2$ or $Na_2CO_3$ are added to the dissolved $SrCl_2$ to precipitate the purified strontium carbonate as in the black ash process.

$$SrCl_2 + H_2O + CO_2 \rightarrow SrCO_3 + 2HCl \text{ or}$$

$$SrCl_2 + Na_2CO_3 \rightarrow SrCO_3 + 2NaCl$$

However, the direct conversion method precludes the use of medium or low-grade ores (95%-80% strontium sulfate) as a starting product if the desired end-product is a high purity strontium carbonate without additional steps to ensure a high purity product.

Because celestine ore typically includes 90-95% strontium sulfate with iron, barium, and calcium sulfates as the main impurities, processing celestine ore is the preferred method for producing high purity strontium sulfate, and subsequently strontium carbonate, known in the art. For instance, U.S. Pat. Nos. 4,842,833, 4,666,688, WO 2001/077021 and others describe methods for deriving strontium from celestine ore. These processes deal with high concentrations of soluble strontium salts with challenging, multiple step process control conditions. However, they are subject to the difficulties described above.

Some have sought to derive strontium from non-ore sources, such as brines. Many of these, such as disclosed in U.S. Pat. Nos. 3,029,133 and 4,980,135 and Chinese Patent Nos. 103351015A and 102765740B, derive high purity strontium carbonate from brine or solutions of soluble strontium salts by specific impurity removal, such as the removal of barium. However, these prior art examples begin their processes using solutions having appreciable concentrations of strontium, such as above 1%, and ratios of barium to strontium higher than 0.05. Many of these brines are derived from leaching ore with acids. For instance, U.S. Pat. No. 3,029,133 describes a method of producing strontium carbonate and strontium sulfate from brines primarily consisting of calcium and strontium halides. The sulfates of strontium and calcium were formed by reaction with magnesium sulfate and the resulting precipitate was washed with hydrochloric acid, similar to U.S. Pat. Nos. 4,848,233 and 4,666,688, thus removing soluble calcium chloride and leaving behind strontium sulfate. To this strontium sulfate slurry, sodium carbonate was added and the resulting strontium carbonate is produced. The process deals with $CaCl_2$ brine concentrations from 3.43 to 7.44% in the presence of $SrCl_2$ from 1.94 to 2.05% with preferred molar ratios of calcium to strontium of less than 7:1. Indeed, the process claims only purification of strontium and calcium halide brines to produce $CaSO_4$ and strontium sulfate. The process requires a mineral acid leach to remove materials which are preferable precipitates from the brine such as barium sulfate and also forms insoluble calcium sulfate which must subsequently be removed.

There are other potential sources of strontium. For instance, strontium has been found present in subterranean brines such as oilfield brine from produced water. In the oil and gas industry, wells are drilled and oil or natural gas mined (or "produced") from the wells through drilling or hydraulic fracturing. Water is used to facilitate and is also a product of this process. The first water which comes up during drilling or hydraulic fracturing a well is mainly the fluid which was pumped down and is called "flow-back". After this, the water which comes up with oil or gas production is called "produced water". Sometimes produced water is used in communications to include flow-back water. U.S. Patent Application Publication No. 2017/0217802 discloses methods of removing toxic barium and radioactive material from produced water. Specifically, it describes a method for removing barium and naturally occurring radioactive material from oil and gas produced water by adding sulfate. Although sulfate addition to co-precipitate radium with barium has been described since at least the early part of the 20th century, this publication combined the use of an anionic flocculant to aid in the dewatering of the barium sulfate wet-cake. It does not, however, address strontium removal.

U.S. Pat. No. 8,877,690 describes methods of treating oilfield brine to remove barium, which is toxic, from the produced wastewater, resulting in metal sulfates and carbonates, including strontium carbonate and calcium carbonate. Specifically, it discloses treating an oilfield brine, such as production or hydraulic fracturing flowback water, to make pure salts by an evaporation process and includes provisions for metal sulfate and carbonate removal by reaction with sources of sulfate and carbonate to produce a predominately chloride brine free of metals which are precipitated by sulfate or carbonates as process impurities. In particular, predominantly barium sulfate as well as potentially manganese and iron sulfates are removed in a first solids separation step. In a described subsequent step, carbonate may be added which removes calcium and strontium together, not separately, as carbonates. Although the process may work well for its intended purpose of brine purification, it is not a process to produce pure strontium carbonate. It also does not describe a process to separate calcium from strontium.

Similarly, U.S. Pat. No. 8,273,320 and WO 2010/151729 disclose methods for making pure salts from post-drilling flowback water with ultrafiltration as a pre-treatment followed by one or more precipitation steps to produce materials such as barium sulfate, strontium carbonate, calcium carbonate followed by production of sodium and calcium chloride. However, neither address purifying or separating the strontium carbonate from calcium carbonate. In fact, they disclose precipitating barium salts first, then co-precipitating strontium and calcium salts together. They therefore cannot be used as a method to achieve high purity strontium carbonate.

Others have separated strontium from calcium, such as in U.S. Patent Application Publication No. 2014/0158632 which describes a crystallization and separation method wherein seed crystals of a targeted salt (strontium salt) are added to a mixture of soluble salts (including strontium salts and calcium salts), also in an oil or gas production brine, including the soluble target salt for targeted crystallization of the strontium salt. Upon addition of the seed crystals, the targeted salt is selectively crystalized and separated as a pure target salt. A separation procedure follows. Such a process requires the soluble salt to be near its saturation value, though, and requires substantially more process control. It is not a useful tool in separating out targets of very low concentration in solution. In addition, the process does not demonstrate separation of barium from strontium but rather both barium and strontium from a high concentration calcium chloride brine. Therefore, the strontium is still contaminated with barium and is not pure.

Therefore, despite the known presence of strontium in subterranean brines, purification of strontium from such sources, free of contaminants and in a form that is commercially saleable, has yet to be demonstrated. There is still a need for a method for production of substantially pure strontium carbonate from subterranean brines used as a feed wherein the strontium concentrations are not the dominant brine materials and the brines contain barium and calcium.

SUMMARY OF THE INVENTION

The invention described below overcomes limitations of the prior art described above. These and other objects are achieved by the method of the present invention which produces substantially pure strontium sulfate and/or strontium carbonate from naturally or man-made salt solutions, a non-limiting example of which are subterranean brines. Notably, this process is capable of deriving strontium from solutions with very low levels of strontium, typically less than 1% in the process brine, as well as those in which strontium is a minor material in a brine dominated by alkali halide such as sodium chloride. The process achieves these results even in situations where ratios of barium to strontium are typically 100 to 1000 times greater than those described in the prior art, without the requirement of a mineral acid leach to remove preferable precipitates such as barium sulfate and disposal of insoluble calcium sulfate.

In brief, the method precipitates barium sulfate ($BaSO_4$) using a source of sulfate anion such as sulfuric acid or $Na_2SO_4$ at ambient temperature with a small amount of strontium leaving a substantially barium-free brine.

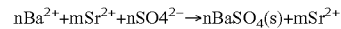

$$nBa^{2+}+mSr^{2+}+nSO_4^{2-} \rightarrow nBaSO_4(s)+mSr^{2+}$$

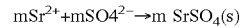

$$mSr^{2+}+mSO_4^{2-} \rightarrow m\ SrSO_4(s)$$

In the equations above, n is the number of moles of $Ba^{2+}$ and m is the number of moles of $Sr^{2+}$.

$BaSO_4$ has a much lower equilibrium solubility product ($Ksp\ 1.08*10^{-10}$ at 25° C.) than strontium sulfate ($3.44*10^{-7}$) and hence is the chemically preferred material to precipitate before any strontium sulfate would precipitate. The solids are separated by settling and/or filtration. Additional sulfate is added to the remainder of the brine components in a stoichiometric amount slightly less than the amount of strontium in solution. This yields a relatively pure strontium sulfate precipitate. Calcium sulfate does not precipitate because its Ksp ($2.4*10\ -5$) is higher than that of strontium sulfate and thus remains dissolved in solutions. Similarly, other common cations do not form sulfate precipitates along with the strontium sulfate.

The strontium sulfate is separated and washed and then mixed with water. As an end-product in this process, the strontium sulfate production is completed by a drying stage. Otherwise $Na_2CO_3$ and/or $CO_2$ to directly added to the strontium sulfate slurry to form the high purity strontium carbonate as a precipitate. Upon addition of water to the strontium sulfate, a slight amount is soluble in water, about 0.01 g/100 mL. The dissolved strontium sulfate reacts with the $Na_2CO_3$ and/or $CO_2$.

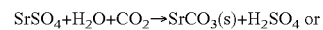

$$SrSO_4+H_2O+CO_2 \rightarrow SrCO_3(s)+H_2SO_4 \text{ or}$$

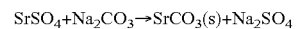

$$SrSO_4+Na_2CO_3 \rightarrow SrCO_3(s)+Na_2SO_4$$

As long as there is dissolved strontium sulfate, it is mostly precipitated by the available dissolved carbonate as the favored reaction product due to its lower $K_{sp}$ of $5.6*10^{-10}$. It should be noted that the $K_{sp}$ values provided herein are for reactions performed in water rather than brine solutions where they will be slightly different. However, they are illustrative of the solubility and favoured reaction products from brine solutions as well since water is the solvent in brine solutions.

The precipitated strontium carbonate is washed and then dried, resulting in a high purity material. Furthermore, the produced $Na_2SO_4$ is recovered and reused in the prior process stage(s) thus lending to the overall economy of the process.

In one aspect, the present invention provides a method for producing strontium carbonate from an aqueous subterranean halide brine solution containing barium at a concentration greater than 50 mg/l; sodium at a concentration of greater than 5000 mg/l; strontium at a concentration of less than 30,000 mg/l; and calcium, iron or manganese at a concentration greater than 10 mg/l, comprising the steps of:
  a. precipitating barium sulfate from the aqueous subterranean halide brine solution with a first sulfate-containing reagent;
  b. precipitating strontium sulfate from the effluent with a second sulfate-containing reagent;
  c. optionally washing the strontium sulfate; and
  d. separating and converting the strontium sulfate to strontium carbonate with a carbonate-based reagent.

In embodiments, the aqueous subterranean halide brine solution comprises strontium at a concentration less than any of 30,000 mg/l or 10,000 mg/l or 100 mg/l or 50 mg/l . In embodiments, the aqueous subterranean halide brine solution comprises sodium at a concentration of greater than any of 5,000 mg/l or 10,000 mg/l or 15,000 mg/l.

In embodiments, the aqueous subterranean halide brine solution comprises calcium, iron or manganese at a concentration greater than 10 mg/l. In embodiments, the aqueous subterranean halide brine solution comprises calcium, iron or manganese at a concentration greater than 1,000 mg/l.

In embodiments, the first sulfate-containing reagent is at least one of sodium sulfate, potassium sulfate, lithium sulfate, ammonium sulfate, magnesium sulfate, and sulfuric acid.

In embodiments, the second sulfate-containing reagent is at least one of sodium sulfate, potassium sulfate, lithium sulfate, ammonium sulfate, magnesium sulfate, and sulfuric acid.

In embodiments, the carbonate-containing reagent is one of sodium carbonate, potassium carbonate, lithium carbonate, or ammonium carbonate.

In embodiments, the process further comprises a pretreatment step of removing solids in the brine performed by one or more of: filtration, settling, density-based separation, oxidation, absorption, chelation, pH control, and ion-exchange or other solids removal steps.

In embodiments, the process further comprises the step of separating the precipitated barium sulfate from the aqueous subterranean halide brine solution prior to the precipitation of strontium sulfate.

In embodiments, the precipitated barium sulfate is separated by densification using a settling tank/clarifier or by filtration or a hydrocyclone.

In embodiments, the process further comprises the step of separating the precipitated strontium sulfate from the effluent prior to its conversion to strontium carbonate.

In embodiments, the precipitated strontium sulfate is separated by densification using a settling tank/clarifier or by filtration or by a hydrocyclone.

In embodiments, the precipitated strontium sulfate is washed with an aqueous solvent, or with water and/or acid; or acid washed followed by pH increase, solids separation and water washing.

In embodiments, the conversion of strontium sulfate to insoluble strontium carbonate is performed in an aqueous suspension.

In embodiments, the process further comprises the step of separating the strontium carbonate from the aqueous suspension.

In embodiments, the strontium carbonate is separated by densification using a settling tank/clarifier or by filtration or by a hydrocyclone.

In embodiments, the process further comprises the step of washing the separated strontium carbonate with water.

It will be appreciated that all allowable combinations of the embodiments of the inventions described above and throughout this specification are contemplated as additional embodiments of the invention.

DETAILED DESCRIPTION

Figure 1:
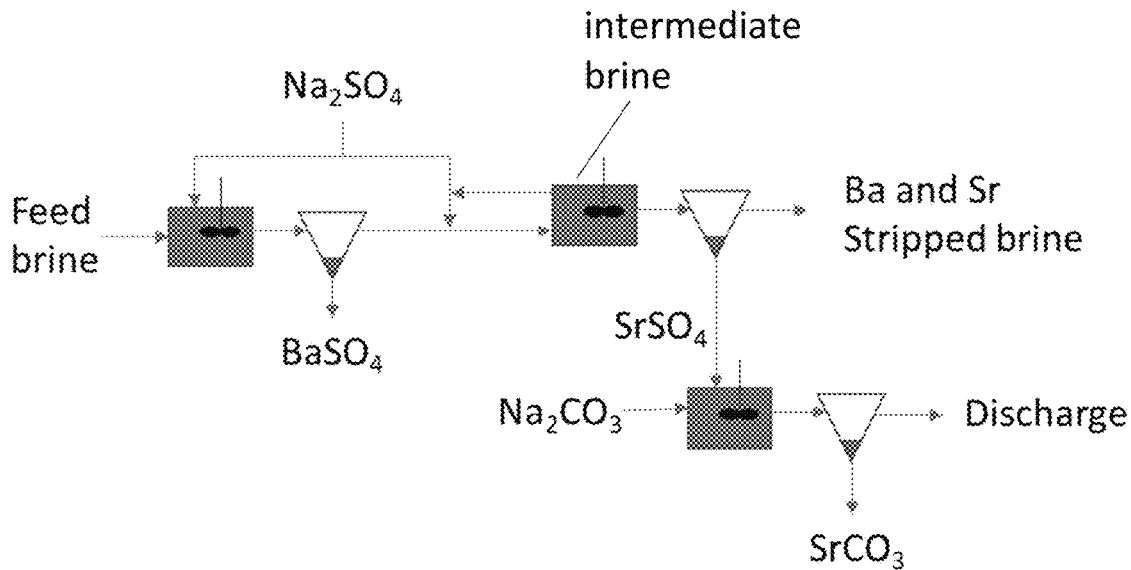
FIG. 1 is schematic diagram of a first embodiment of the process of the present invention.

The following description sets forth numerous exemplary configurations, parameters, and the like. It should be recognised, however, that such description is not intended as a limitation on the scope of the present invention but is instead provided as a description of exemplary embodiments.

The present invention describes methods for an economical process for producing substantially pure strontium carbonate or strontium sulfate from subterranean brines having low (<1%) concentrations of strontium such as those produced during oil and gas operations. Typically, the composition of these brines is dominated by chloride as the anion with sodium being the dominant cations followed by strontium, barium, calcium, potassium, magnesium, manganese and various other cations and anions as minor constituents. These brines are considered waste products in oil and gas operations. Creation of a valuable strontium carbonate or strontium sulfate from these brines is a beneficial and more sustainable utilization of resources as well providing an economic benefit.

Definitions

In each instance herein, in descriptions, embodiments, and examples of the present invention, the terms "comprising", "including", etc., are to be read open-ended and expansively, without limitation. Thus, unless the context clearly requires otherwise, throughout the description and the claims, the words "comprise", "comprising", and the like are to be construed in an inclusive sense as to opposed to an exclusive sense, that is to say in the sense of "including but not limited to".

The term "about" or "approximately" as used herein means within 20%, more preferably within 10%, and most preferably still within 5% of a given value or range. Percent and mg/L may be used interchangeably where 1% is equivalent to 10,000 mg/L.

The term "brine" or "brine solution" as used herein means an aqueous solution including halide salts. The fraction of total halides in one embodiment are >99% chloride and less than 1% fluoride, less than 1% iodide, and less than 1% bromide. In another embodiment the halides are >95% chloride, and less than 5% fluoride, less than 5% iodide and less than 5% bromide. In another embodiment the fraction of total halides are >80% chloride and less than 20% fluoride, less than 20% iodide, and less than 20% bromide. The halide concentrations are defined by the cation concentrations. In one embodiment, the cations are sodium greater than 5,000 mg/l, barium greater than 100 mg/l, calcium greater 500 than mg/l, or magnesium greater than 100 mg/L, and strontium greater than 500 mg/l. In another embodiment, the cations are sodium less than 400,000 mg/l, barium less than 20,000 mg/l, calcium less than 10,0000 mg/l, or magnesium less than 100 mg/L, and strontium greater than 500 mg/l and less than 20,000 mg/L.

The term "subterranean brine" as used herein means a brine derived from below the surface of the earth.

The term "produced water" as used herein means fluid that is produced from an oil or gas well as a result of well operations in the drilling, mining or production of oil or gas, such as natural gas, from a subterranean well, such as but not limited to hydraulic fracturing (also known as hydrofracturing or fracking) flowback water. Produced water is a subset of subterranean brine.

The term "aqueous subterranean halide brine solution", unless otherwise specified, refers generally to subterranean brines produced from oil or gas conventional or shale formations. typically having a concentration of less than 20,000 mg/L strontium and often even less barium, such as but not limited to less than 3,000 mg/L barium. For instance, in at least one embodiment the aqueous subterranean halide brine solution includes 300 mg/L to 3,000 mg/L barium and 1,000 to 10,000 mg/L and strontium, in the presence of total dissolved solids (TDS) concentrations ranging from 100,000 to 500,000 mg/L. More commonly, barium concentrations may be in the range of 30 to 4,000 mg/L, and in some embodiments may be in the range of 500 to 3,000 mg/L, compared to TDS common ranges of 150,000 to 250,000 mg/L. Strontium concentrations may be in the range of 300 mg/L to 10,000 mg/L, and in some embodiments may be in the range of 3,000 to 9,000 mg/L, compared to TDS ranges 150,000 to 250,000 mg/L. Thus, strontium is typically a minor component of the overall ionic composition of aqueous subterranean halide brine solutions and the barium concentration is typically lower than the strontium concentration. Therefore, "aqueous subterranean halide brine solution" as defined and used herein, is a significant distinction from ore composition purification methodologies currently used to derive or produce strontium carbonate and/or strontium sulfate.

The term "halide" refers to any compound containing a halogen atom, or to a halogen anion. Examples of halides include chloride, fluoride, iodide and bromide. In at least one embodiment, chloride may be the dominant halide in subterranean brines but other lower concentration halides may also be present.

The present disclosure provides novel methods or processes to derive greater than 80% to 99.99% purity strontium carbonate or strontium sulfate from subterranean brines. Subterranean brines have heretofore not been a raw material for commercial strontium carbonate production. Subterranean brines are impure and thus require an economical separation and purification process for high purity strontium carbonate or strontium sulfate production which has yet to be achieved.

FIG. 1 shows a flow diagram of a first embodiment of the process of the present invention. In this embodiment, feed brine is blended with sodium sulfate to precipitate out the barium from the feed brine. The sodium sulfate dose is preferably 0.1% molar excess of the barium concentration, though in other embodiments it may be up to 1%, up to 15%, or up to 30% in molar excess thereof. The molar excess of sodium sulfate used may depend on the scale of processing. The larger the molar excess of sodium sulfate used in this precipitation step, the lower the ultimate yield of strontium sulfate. This results in complete precipitation of the barium from the feed brine as barium sulfate and some slight precipitation of strontium sulfate only to the extent of the molar excess quantity of sodium sulfate consumed by the barium. As a water solution, given the known solubility product of barium sulfate, the remaining barium in solution is approximately 10 µM (0.014%). In brine solutions it will be slightly different due to the influence of the ionic composition but will nonetheless be very low. The solid barium sulfate (including a small concentration of strontium sulfate) is separated by a densification process such as a clarifier, where the solid barium sulfate settles to the bottom of the clarifier, such as by gravity. The remaining solution may be referred to as intermediate brine and is a barium-depleted brine. This intermediate brine may be decanted to isolate from the precipitated barium sulfate.

The intermediate brine is added to a second stage mixer where is it blended with additional amounts of sodium sulfate to precipitate strontium sulfate. This Figure shows the sodium sulfate added in a recycling loop where a concentrated sodium sulfate solution may be added at a small flowrate into a larger flowrate in to and out of the intermediate brine tank. The sodium sulfate added in this step is quantitatively dosed at slightly under the molar concentration of the strontium, preferably less than 0.1% though in other embodiments at less than 1% or less than 15%, or in other embodiments less than 50% or in other embodiments, less than 70% to avoid precipitating materials such as calcium or to allow more than one batch operation on the same depleted brine. As before, the lower the molar equivalent concentration of sodium sulfate relative to the strontium ion concentration used, the lower the resulting yield of strontium sulfate, and may depend on the scale of processing.

The final step in this embodiment is the metathesis reaction of sodium carbonate with the strontium sulfate to form the solid strontium carbonate which is separated by a densification process.

Figure 2:
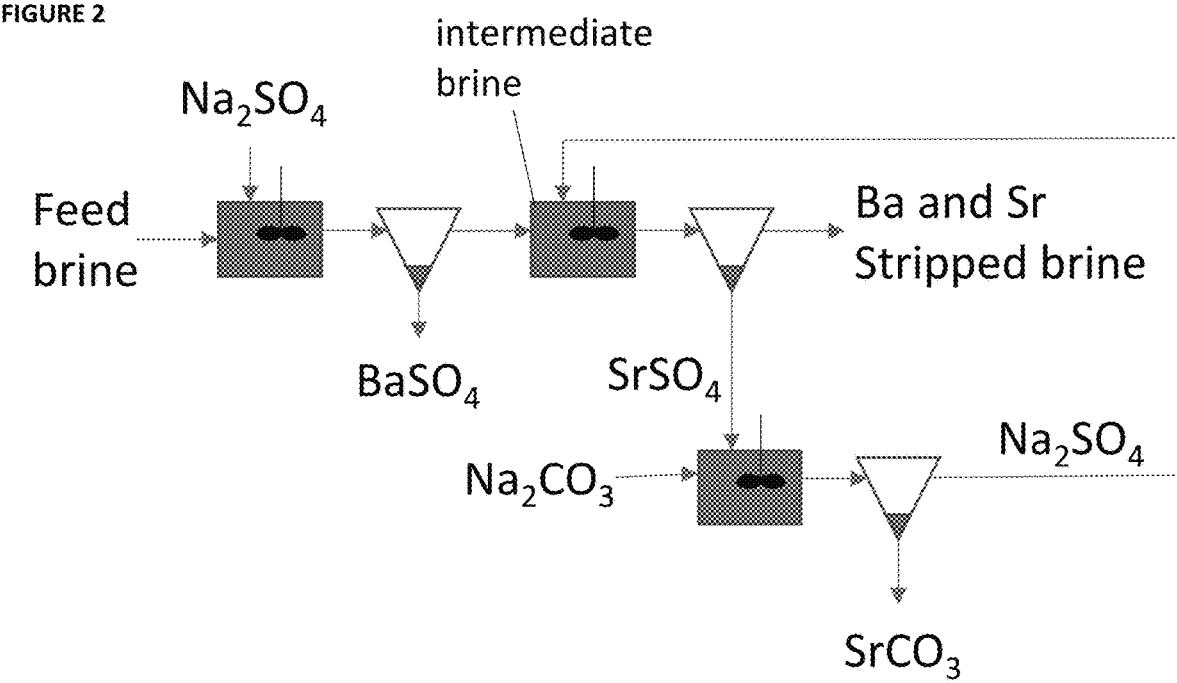
FIG. 2 is a schematic diagram of a second embodiment of the invention illustrating recycling of the sodium sulfate from the third stage of process densification.

A second embodiment of the process is illustrated in FIG. 2. In this embodiment, the clarified liquid from the strontium sulfate to strontium carbonate metathesis is primarily sodium sulfate and water. This stream is recycled to the strontium sulfate blender. The example illustrated is one example of where this stream may be directed but is not meant to be limiting. There may also be some residual strontium dissolved in this stream and rather than discharging it, it is conserved in the process through this recycle stream.

Figure 3:
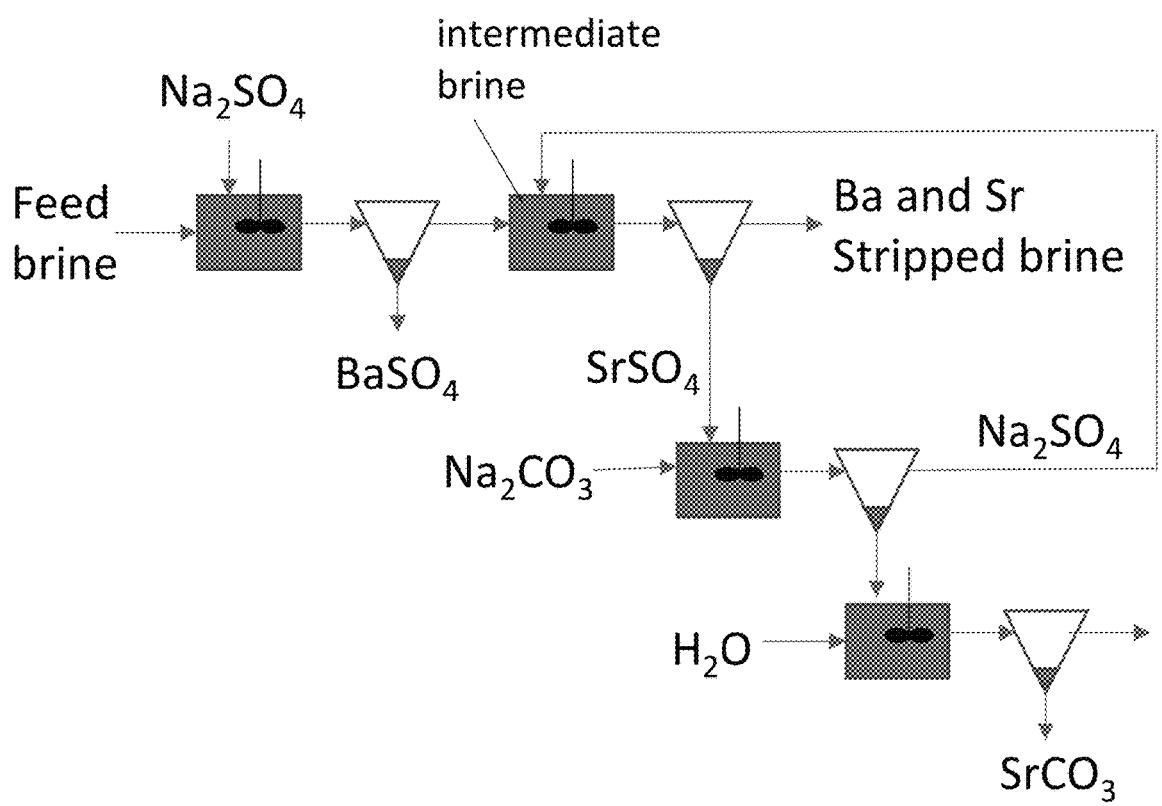
FIG. 3 is a schematic diagram of a third embodiment of the invention illustrating recycling of sodium sulfate and washing of the strontium carbonate.

A third embodiment of the process is illustrated in FIG. 3. This embodiment builds upon the prior embodiments by incorporating a wash stage for the strontium carbonate to remove any potentially soluble salts before the separation process of the strontium carbonate.

Figure 4:
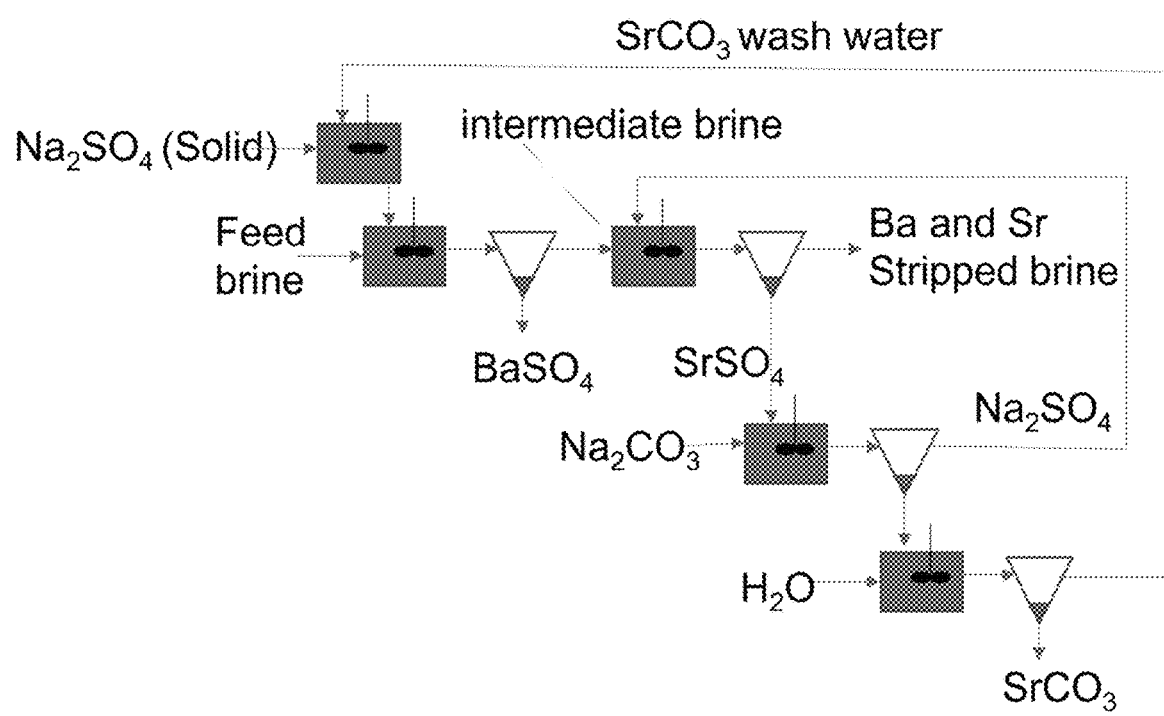
FIG. 4 is a schematic diagram of a fourth embodiment of the invention illustrating a recycling option for the strontium carbonate wash water.

In a fourth embodiment, illustrated in FIG. 4, based upon the prior embodiments, the discharge of the wash water for the strontium carbonate purification is recycled to an earlier point in the process. This embodiment conserves water as well as soluble yet low concentration strontium at this stage. The example illustrated is one example of where this stream may be directed but is not meant to be limiting. In this example, the used wash water is blended with solid sodium sulfate which is then added as a solution to the initial feed brine.

Figure 5:
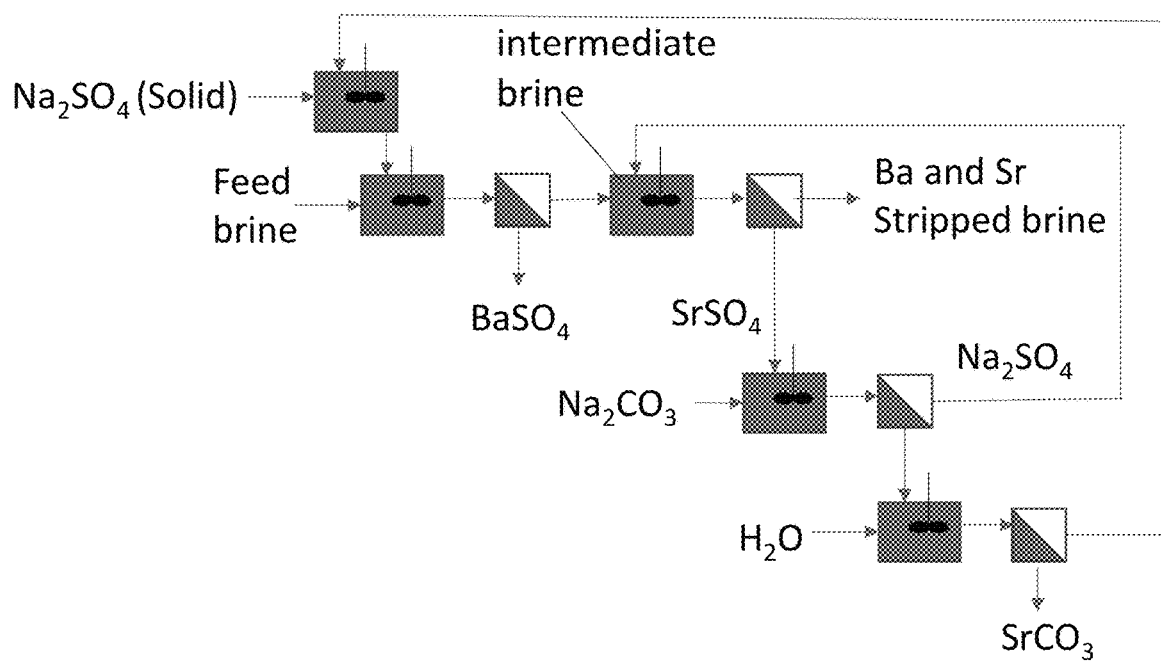
FIG. 5 is a schematic diagram of a fifth embodiment of the invention replacing clarifiers from FIG. 5 with filters.

In a fifth embodiment, any or all of the clarification or densification stages may be replaced by fine filtration equipment. The filters may range preferably from 10 nm to 100 nm or optionally 100 nm to 1000 nm pore sizes or 1000 nm to 100 μm pore size. This embodiment is illustrated in FIG. 5 where all the clarifiers are replaced by filters. Any or all of these filters may be a hydrocyclone operation.

Figure 6:
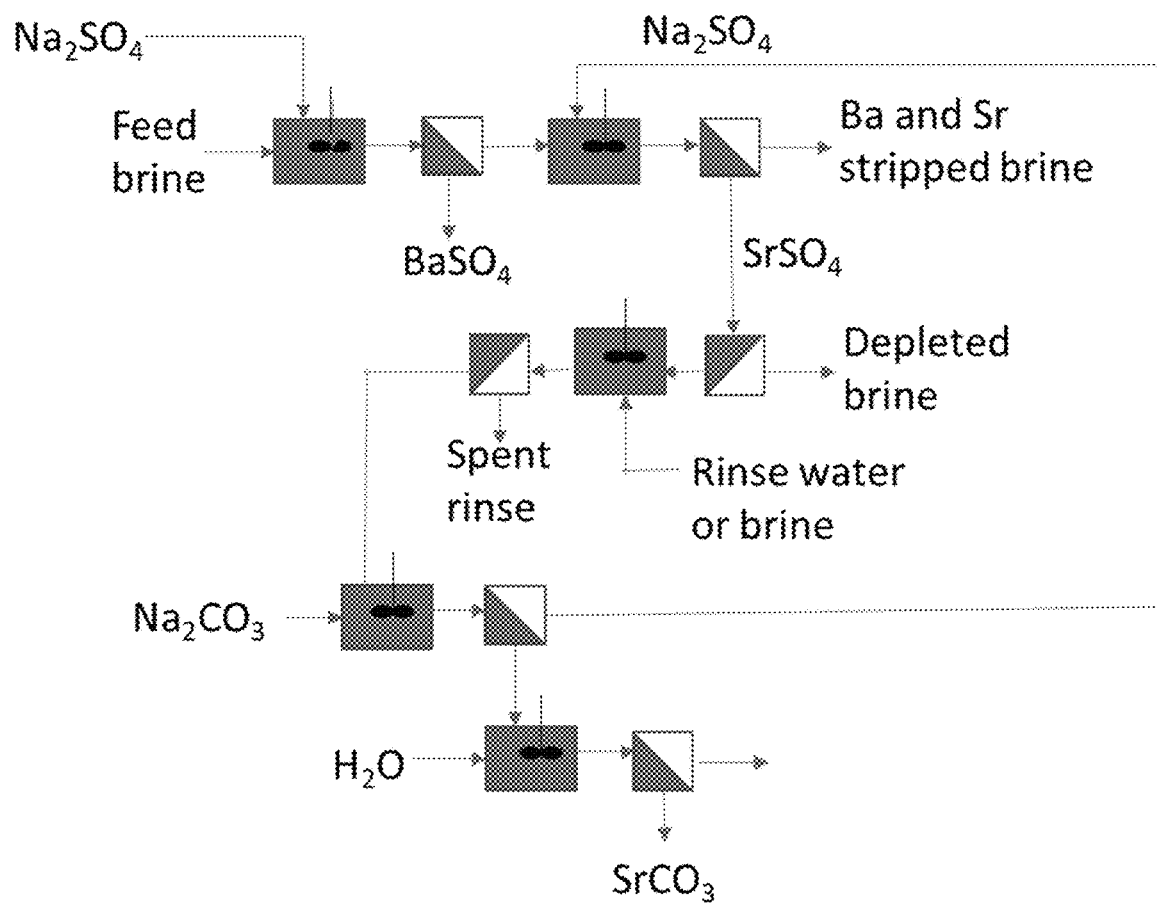
FIG. 6 is a schematic diagram of a sixth embodiment of the invention with an added wash step for rinsing the strontium sulfate.

In a sixth embodiment, shown in FIG. 6, the strontium sulfate is rinsed to purify the strontium sulfate by removing calcium sulfate. Water or water containing a halogen salt such as sodium chloride up to the saturation concentration of the salt may be used for the rinse.

Notably, for all of the solid separation steps employed, common technologies for filtration, dewatering and/or drying such as filter presses or the addition of dewatering aids such as coagulants, flocculants or polymers may be employed to help in the drying process or the use of recycle loops to aid in the separation.

EXAMPLES

The examples described herein are provided for the purpose of illustrating specific embodiments of the invention and are not intended to limit the invention in any way. A list of general principles, in no particular order, demonstrated in the examples are:
1. Barium sulfate is greatly favored over strontium and calcium sulfate in terms of reaction with aqueous sulfates.
2. Strontium sulfate is favored over calcium sulfate by equilibrium reaction with aqueous sulfates, but the reaction is rate limited by mass transfer and crystallization induction kinetics thus calcium sulfate will often be an impurity not predicted by equilibrium modeling.
3. Carbonate solutions react with strontium and calcium sulfates to make strontium and calcium carbonates.
4. Iron and other metal impurities dissolve at low pH and precipitate at high pH.
5. Calcium sulfate is more soluble than strontium sulfate thus allowing washing options to separate calcium sulfate from strontium sulfate.
6. Calcium carbonate and strontium carbonate both dissolve in acid solutions.

Persons of ordinary skill can utilize the disclosures and teachings herein to produce other embodiments and variations without undue experimentation. All such embodiments and variations are considered to be part of this invention.

Example 1

Thermodynamic Modelling Data

As an example of the process equilibrium driving the embodiments, a simulation was done using OLI Systems Studio StreamAnalyzer (version 10) to guide and demonstrate the processes described in this publication. The starting material for the simulation was based upon the composition of a known subterranean brine and is shown below in Table 1:

TABLE 1

Subterranean brine soluble ionic composition used for precipitation simulation from actual brine used in purification embodiments.

| Ionic Species | Concentration, mg/L | Concentration, mM |
| --- | --- | --- |
| Cl−1 | 152095 | 4290.0 |
| Na+1 | 61400 | 2670.7 |
| Ca+2 | 23900 | 596.3 |
| Sr+2 | 6930 | 79.1 |
| Ba+2 | 3140 | 73.2 |
| K+1 | 2480 | 63.4 |
| Mg+2 | 1780 | 22.9 |
| Br−1 | 299 | 13.5 |
| Li+1 | 94 | 3.7 |
| Fe+2 | 89 | 1.6 |
| HCO3−1 | 55 | 0.9 |
| Mn+2 | 20 | 0.4 |

Figure 7:
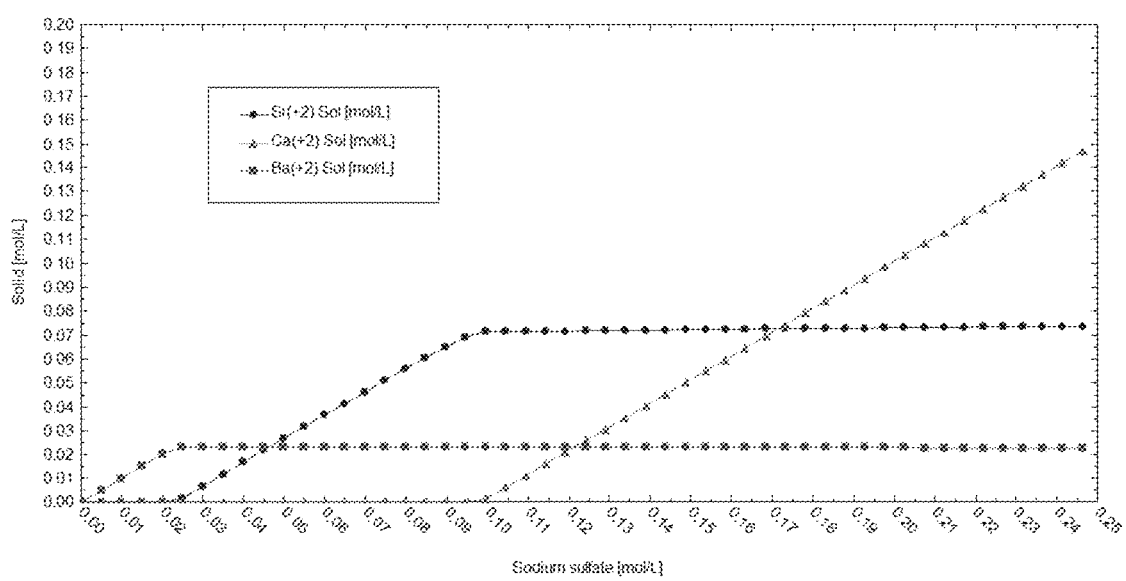
FIG. 7 is a graph showing the mass in moles per liter of solution of barium, strontium and calcium precipitated as respective sulfates from initial feed brine upon increasing dosage of sodium sulfate.

The simulation of sulfate precipitation upon addition of sodium sulfate is shown in FIG. 7, the barium precipitates first in relation to the sodium sulfate dose, followed by the strontium, followed by the calcium for this simulation. When 0.025 M sodium sulfate is added, the barium is precipitated and separated as barium sulfate and the soluble aqueous composition of the solution is shown below in Table 2.

TABLE 2

Simulated composition of element species of aqueous phase mixture in Table 1 after addition of 0.025M sodium sulfate.

| Element Species | Aqueous Phase, mM | Solid Phase, mM | Liquid Phase, mg/L | Solid Phase, mg/L |
| --- | --- | --- | --- | --- |
| H(+1) | 1.02E+05 | 0.00E+00 | 1.03E+05 | 0.00E+00 |
| O(−2) | 5.10E+04 | 2.37E−11 | 8.17E+05 | 7.59E−10 |
| Cl(−1) | 4.29E+03 | 0.00E+00 | 1.52E+05 | 0.00E+00 |
| Na(+1) | 2.72E+03 | 0.00E+00 | 6.25E+04 | 0.00E+00 |
| Ca(+2) | 5.96E+02 | 0.00E+00 | 2.39E+04 | 0.00E+00 |
| Sr(+2) | 7.73E+01 | 5.93E−12 | 6.77E+03 | 1.04E−09 |
| Mg(+2) | 7.32E+01 | 0.00E+00 | 1.78E+03 | 0.00E+00 |
| K(+1) | 6.34E+01 | 0.00E+00 | 2.48E+03 | 0.00E+00 |
| Li(+1) | 1.35E+01 | 0.00E+00 | 9.40E+01 | 0.00E+00 |
| Br(−1) | 3.74E+00 | 0.00E+00 | 2.99E+02 | 0.00E+00 |
| Fe(+2) | 1.59E+00 | 0.00E+00 | 8.90E+01 | 0.00E+00 |
| C(+4) | 9.01E−01 | 0.00E+00 | 1.08E+01 | 0.00E+00 |
| S(+6) | 4.18E−01 | 5.93E−12 | 1.34E+01 | 3.80E−10 |
| Mn(+2) | 3.64E−01 | 0.00E+00 | 2.00E+01 | 0.00E+00 |
| Ba(+2) | 4.47E−02 | 0.00E+00 | 6.14E+00 | 0.00E+00 |
| Fe(+3) | 5.11E−09 | 0.00E+00 | 2.85E−07 | 0.00E+00 |

In Table 2, it is noted that there are essentially no solids (solid strontium is calculated at 1 part per trillion), the barium remains soluble at 0.0447 mM (6.14 mg/L), the strontium concentration is 77 mM (6770 mg/L), and the calcium concentration is 596 mM (23900 mg/L).

Figure 8:
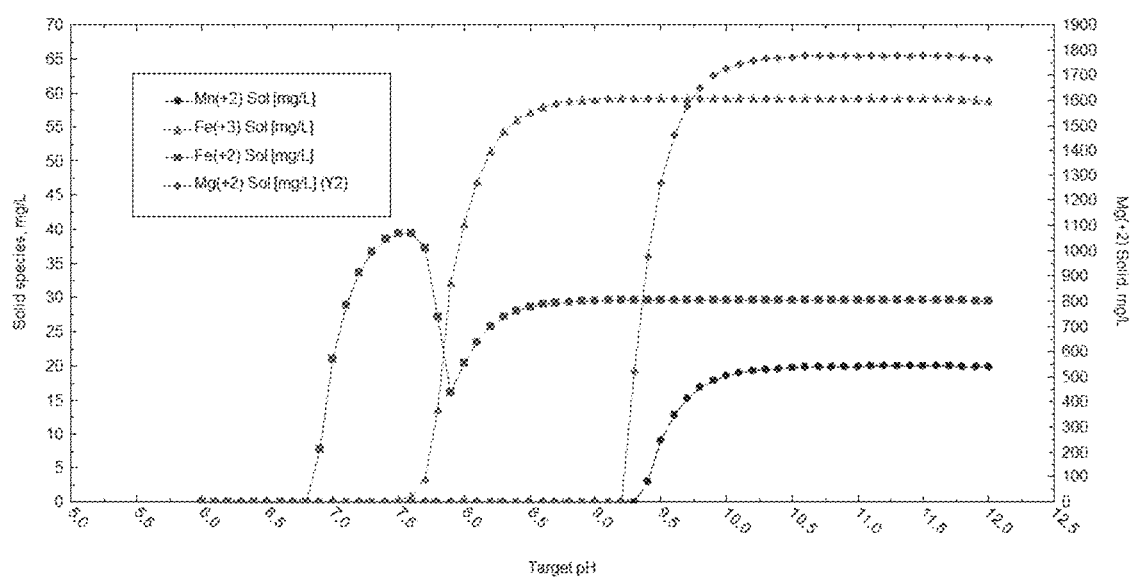
FIG. 8 is a graph of the modelled metals precipitated from a barium depleted brine using pH control.

At this step in the simulation, or an earlier step in practice, the iron, manganese and magnesium can be separated by raising the pH as shown in FIG. 8. Maximum removal of iron occurs above pH 8.5 followed manganese and magnesium above pH 10.5. After solids are removed, the simulated stream composition at pH 10.5 is shown below in Table 3:

TABLE 3

Simulated composition of element species of aqueous phase mixture at pH 10.5 of mixture from Table 2 after solids removal.

| Element Species | Aqueous Phase, mM | Aqueous Phase, mg/L |
|---|---|---|
| H(+1) | 1.02E+02 | 1.03E+05 |
| K(+1) | 6.33E−02 | 2.48E+03 |
| Na(+1) | 2.87E+00 | 6.60E+04 |
| Ba(+2) | 4.42E−05 | 6.07E+00 |
| Ca(+2) | 5.95E−01 | 2.38E+04 |
| Fe(+2) | 7.06E−08 | 3.94E−03 |
| Mg(+2) | 2.16E−04 | 5.26E+00 |
| Mn(+2) | 4.73E−06 | 2.60E−01 |
| Fe(+3) | 3.00E−12 | 1.68E−07 |
| Cl(−1) | 4.28E+00 | 1.52E+05 |
| Br(−1) | 3.74E−03 | 2.99E+02 |
| Li(+1) | 1.35E−02 | 9.38E+01 |
| C(+4) | 8.32E−05 | 9.99E−01 |
| S(+6) | 4.17E−01 | 1.34E+01 |
| Sr(+2) | 7.72E+01 | 6.76E+03 |

Thus, at pH 10.5, the soluble iron, magnesium, and manganese concentrations are very low. After the barium, iron, magnesium and manganese solids are removed, additional 0.07 M sodium sulfate is added to the mixture from Table 3. The solids are separated and are 99.93% strontium sulfate and 0.07 percent barium sulfate thus resulting in a high purity strontium sulfate.

To the separated high purity strontium sulfate, an aqueous solution with a 0.03 M excess is added. The strontium sulfate reacts with the sodium carbonate to form strontium carbonate and soluble sodium sulfate. The resulting solid from the simulation is 99.91% strontium carbonate with 0.09% barium sulfate.

Example 2

Demonstration of Solubilities of Strontium and Calcium Sulfates

To produce a high purity material, the calcium sulfate can be rinsed from the strontium sulfate because it has a higher solubility in water and brines, than the strontium sulfate. Both materials were independently slurried in distilled water, as well as in a 20% sodium chloride brine to determine if salt content had any effect on solubility. The solids were settled and the supernatant liquid was filtered through a 0.45 μm filter and the resulting cation concentrations determined as shown in Table 4 below where "NA" means "Not Applicable".

TABLE 4

Solubility of strontium and calcium sulfates.

| material | Ca mg/L | Sr mg/L | CaSO4 mg/L | SrSO4 mg/L |
|---|---|---|---|---|
| distilled water | <3 | <3 | <10 | <6 |
| distilled water saturated in Calcium Sulfate | 701 | NA | 2381 | NA |
| distilled water saturated in Strontium Sulfate | NA | 42.1 | NA | 88 |
| 20% sodium chloride brine | 125 | 10.6 | 336 | 22 |
| 20% sodium chloride brine saturated in Calcium Sulfate | 2050 | NA | 6963 | NA |
| 20% sodium chloride brine saturated in Strontium Sulfate | NA | 177 | NA | 371 |

The data from Table 4 above indicates that calcium sulfate has a higher solubility than sodium sulfate in both water and sodium chloride brines. Thus, depending upon the availability at the process site, either water or sodium chloride brines may be used to gain additional purity of strontium sulfate. Though demonstrated using sodium chloride, other halide salts or brines could be used for the rinse step if needed or desired. These strontium and calcium sulfate solubilities are used to determine the minimum amount of water or brine needed for this optional purification rinse step. Such a step is only necessary for increasing process flexibility to make different grades of purity using different amounts of calcium sulfate precipitated with strontium sulfate.

Example 3

Demonstration of Strontium Sulfate Production at Larger Scale with Rinses

A 1200-gallon volume of feed brine which had previously been treated to remove barium through sulfate precipitation, contained 29300 mg/L Ca, 2080 mg/L Mg and 6860 mg/L Sr with a total TDS of 462000. A volume of 275 gallons of 2% sodium sulfate (50 kg) was added to a recycling loop of this material in a rate of 2.5 gpm. The amount of sulfate added was equivalent, on a molar basis, to 50% of the strontium in the brine. The resulting slurry containing strontium sulfate was rinsed twice with 1200 gallons of well water.

The resulting strontium sulfate solid contained calcium, iron, potassium, sodium, carbonate, and chloride as shown in Table 5 below. Thus, the strontium sulfate material was 98.5% strontium sulfate on a trace metals basis.

TABLE 5 strontium sulfate produced from subterranean brine at large scale.

| % Ca | % CO3 | % Fe | % Mg | % Mn | % K | % Na | % Cl | % SrSO4 purity |
|---|---|---|---|---|---|---|---|---|
| 0.92 | 0.68 | 0.13 | N.D. | N.D. | 0.17 | 0.32 | 0.24 | 98.5 |

Even with the use of well water, known to have bicarbonate, iron, magnesium and other metals and halides present, a relatively pure strontium sulfate was produced.

Example 4

Demonstration of Purification of Low-Quality Strontium Carbonate Product to High-Quality Strontium Sulfate It is recognized that the procedures described above may not always produce the product purity desired due to actual operating scenarios such as impure wash water, inaccurate feed or reagent concentrations, insufficient mixing and other process conditions. Impure material produced from prior low-quality production from subterranean brine produced at large scale was purified in the two examples below:

The dried starting material had the composition shown in Table 6 of:

TABLE 6

Low-quality strontium carbonate produced from subterranean brine at large scale.

| Carbonate | Ba | Ca | Fe | Na | Sr | Cl | Sulfate |
|---|---|---|---|---|---|---|---|
| 28.6 | 7.15 | 6.57 | 0.586 | 0.261 | 38.8 | 0.018 | 17.1 |

On a cation purity basis which is 100%-percent total cation impurities, this material was 85.4% pure.

In a first step, carbonate metathesis of any calcium and strontium sulfate was carried out by slurrying the solids in water in a 2.4:1 ratio of solids to water to which a 20% molar excess of 21% sodium carbonate solution was added and stirred for 2 hours at room temperature. This step converted most of the remaining strontium sulfate to strontium carbonate. The iron was then solubilized, and carbonate removed by acidifying to a pH <2. The material was ultrafiltered. The filtrate brine pH was increased to >8.2 to precipitate the iron. The remaining solids in the filtrate brine were again filtered for a purified brine.

To purified brine, a molar excess of 10% sodium sulfate relative to the expected Sr concentration was dosed over a period of 8 hours in a mixer. The solids were decanted and rinsed twice with deionized water to remove solid calcium sulfate. The solids were then dried and the resulting material had the composition shown in Table 7, in percent, of:

TABLE 7 strontium sulfate purified from material in Table 6.

| Carbonate | Ba | Ca | Fe | Na | Sr | Cl | Sulfate |
|---|---|---|---|---|---|---|---|
| not detected | 0.53 | 0.16 | not detected | 0.19 | 48.9 | 0.23 | 50.0 |

On a cation purity basis this material was 99.1% pure strontium sulfate.

A similar experiment was done on a different starting material a second time and the resulting composition in percent compared to the starting material is shown in Table 8:

TABLE 8 strontium sulfate purified from subterranean brine impure strontium carbonate, second example.

| | Carbonate | Ba | Ca | Fe | Na | Sr | Cl | Sulfate |
|---|---|---|---|---|---|---|---|---|
| Starting material | 25.2 | 1.26 | 3.95 | 1.3 | .27 | 44.4 | .03 | 17 |
| Final material | not detected | 0.44 | 0.17 | ND | 0.12 | 48 | 0.0014 | 48.4 |

On a cation purity basis, this material was 99.3% pure strontium sulfate. Thus, even poor-quality material may be purified by a combination of rinsing, pH washing and filtration following the examples, principles, and results indicated above.

Example 5

Preparation of Purified Strontium Carbonate from Strontium Sulfate

A batch of strontium sulfate was prepared from a subterranean with a higher mole ratio of sulfate using otherwise the same purification procedure as in Example 5. The resulting strontium sulfate composition in percent, is shown in Table 9:

TABLE 9 strontium sulfate produced from subterranean brine.

| Carbonate | Ba | Ca | Fe | Na | Sr | Cl | Sulfate |
|---|---|---|---|---|---|---|---|
| not detected | 0.284 | 1.39 | not detected | 0.114 | 46.9 | 0.019 | 54 |

The resulting purity was 98.2%, somewhat lower than the examples in Example 5 due to the higher mole ratio of sulfate used in preparation. Nonetheless, the steps employed below were undertaken to demonstrate the preparation of a purified strontium carbonate.

The strontium sulfate was rinsed with water equivalent to 11 times the mass of the solid. The solids were separated by filtration and mixed with 10% excess of 11% sodium carbonate for 18 hours to make a crude strontium carbonate. The resulting wet cake from the crude strontium carbonate was acidified to less than pH 2 to convert the strontium carbonate to soluble strontium chloride. The pH was increased to 10.7 and the remaining sulfate solids were separated by ultrafiltration.

The ultrafiltered solution containing strontium chloride was mixed with at least a molar excess of 10% sodium carbonate at a concentration of 10% for 175 minutes. The wet cake was washed with water to remove excess sodium carbonate and chloride and then dried to produce a purified strontium carbonate with the following composition in percent shown in Table 10 below:

TABLE 10

Strontium carbonate purified from material in Table 9.

| Carbonate | sulfate | Ba | Ca | Fe | Na | Sr | Cl |
|---|---|---|---|---|---|---|---|
| 41.05 | not detected | 0.109 | 0.54 | <.016 | 0.19 | 58.4 | 0.057 |

On a cation purity basis, this material was 99.2% pure strontium carbonate.

The above results demonstrate that the steps employed can be used to prepare purified strontium sulfate and strontium carbonate from a subterranean brine.

The present invention and its embodiments have been described in detail. However, the scope of the present invention is not intended to be limited to the embodiments of any process, manufacture, composition of matter, compounds, means, methods, and/or steps described in the specification. Various modifications, substitutions, and variations can be made to the disclosed material without departing from the spirit and/or essential characteristics of the present invention. Accordingly, one of ordinary skill in the art will readily appreciate from the disclosure that later modifications, substitutions, and/or variations performing substantially the same function or achieving substantially the same result as embodiments described herein may be utilized according to such related embodiments of the present invention. Thus, the following claims are intended to encompass within their scope modifications, substitutions, and variations to combinations, kits, compounds, means, methods, and/or steps disclosed herein.

What is claimed is:

1. A method for producing strontium carbonate from an aqueous brine solution having 300-30,000 mg/L of strontium, 50-10,000 mg/L barium, 5,000-150,000 mg/L sodium and 10-100,000 mg/L calcium, the method comprising the steps of:
   combining the brine solution with an effective amount of a first sulfate-containing reagent to precipitate barium sulfate in a first effluent;
   separating said barium sulfate from said first effluent;
   identifying the molar concentration of strontium in said first effluent;
   combining said first effluent flowing at a first flow rate with an effective amount of a second sulfate-containing reagent through a fluid recycling loop having a second flow rate less than said first flow rate of said first effluent wherein said effective amount of said second sulfate-containing reagent is sufficient to precipitate substantially only strontium sulfate in a second effluent;
   separating said strontium sulfate from said second effluent;
   washing said strontium sulfate with an aqueous solvent;
   suspending said strontium sulfate in an aqueous suspension; and
   combining said strontium sulfate with a carbonate-based reagent to convert said strontium sulfate to strontium carbonate.

2. The method of claim 1, wherein said the first sulfate-containing reagent is selected from the group consisting of: sodium sulfate, lithium sulfate, potassium sulfate, ammonium sulfate and sulfuric acid.

3. The method of claim 2, wherein said first sulfate containing reagent is sodium sulfate and said concentration is up to 30% molar excess of the barium concentration.

4. The method of claim 1, wherein said second sulfate-containing reagent is selected from the group consisting of: sodium sulfate, lithium sulfate, potassium sulfate, ammonium sulfate, strontium sulfate, and sulfuric acid.

5. The method of claim 4, wherein said second sulfate containing reagent is sodium sulfate and said effective amount is less than 70% of said molar concentration of strontium.

6. The method of claim 1, wherein the carbonate-containing reagent is selected from the group consisting of: sodium carbonate, lithium carbonate, potassium carbonate, ammonium carbonate, and carbon dioxide and an alkali.

7. The method of claim 6, wherein said carbonate-containing reagent is gaseous carbon dioxide introduced to said aqueous suspension combined with sodium hydroxide.

8. The method according to claim 1, further comprising the step of pretreating the brine solution utilizing a method selected from the group consisting of: a filtration separation, a density-based separation, a hydrocyclone, an oxidation process, an absorption process, a chelation process, and an ion-exchange process.

9. The method of claim 8, wherein said pretreating step utilizes filtration with a filter having a pore size of 10 to 100 nm, 100 to 1000 nm, or 1000 nm to 100 µm.

10. The method of claim 1, wherein the barium sulfate is separated from said first effluent by a method selected from the group consisting of: densification using a settling tank/clarifier, filtration, and use of a hydrocyclone.

11. The method of claim 1, wherein the strontium sulfate is separated from said second effluent by a method selected from the group consisting of: densification using a settling tank/clarifier, filtration, and use of a hydrocyclone.

12. The method of claim 1, wherein said aqueous solvent is water.

13. The method of claim 1, said aqueous suspension is a water slurry.

14. The method of claim 1, further comprising the step of separating the strontium carbonate from said aqueous suspension by a method selected from the group consisting of:
   densification using a settling tank/clarifier, filtration, and use of a hydrocyclone.

15. The method of claim 1, further comprising the step of washing said strontium carbonate with water.

16. The method of claim 1, wherein any separating step is performed by filtration with a filter having a pore size of 10 to 100 nm, 100 to 1000 nm, or 1000 nm to 100 µm.

17. The method of claim 1, wherein a flow rate ratio between said first flow rate and said second flow rate is between 50 and 2000.

18. The method of claim 1, wherein said second sulfate-containing reagent is concentrated.

19. The method of claim 18, wherein said second sulfate-containing reagent is sodium sulfate and said concentration is between 1-40 percent.

* * * * *